United States Patent [19]

Fujitsubo

[11] Patent Number: 4,842,096
[45] Date of Patent: Jun. 27, 1989

[54] AUTOMOBILE MUFFLER
[75] Inventor: Isamu Fujitsubo, Yokohama, Japan
[73] Assignee: Fujitsubo Giken Co., Ltd., Yokohama, Japan
[21] Appl. No.: 232,818
[22] Filed: Aug. 16, 1988
[51] Int. Cl.$^4$ .............................................. F01N 1/10
[52] U.S. Cl. ................... 181/252; 181/237; 181/239; 181/249; 181/254; 181/282
[58] Field of Search ............... 181/233, 237, 239, 248, 181/249, 251, 252, 254, 255, 259–261, 282, 244

[56] References Cited

U.S. PATENT DOCUMENTS 2,625,234  1/1953  Fina ...................................... 181/239
2,818,131 12/1957  Doughty ............................... 181/244
2,824,619  2/1958  Brener et al. ........................ 181/252
3,396,812  8/1968  Wilcox et al. ....................... 181/250
3,522,863  8/1970  Ignoffo ................................. 181/252

Primary Examiner—B. R. Fuller
Attorney, Agent, or Firm—Cushman, Darby & Cushman

[57] ABSTRACT

Disclosed is an automobile muffler having a drain pipe communicating with the upperstream, upper half inside sound-deadening area of its outer pipe, thereby allowing the moisture of the air drawn into the sound-deadening space to leave for the surrounding atomosphere via the drain pipe prior to condensation of the moisture to water in the sound-deadening space, thus making it unnecessary to drain water from the muffler.

3 Claims, 6 Drawing Sheets

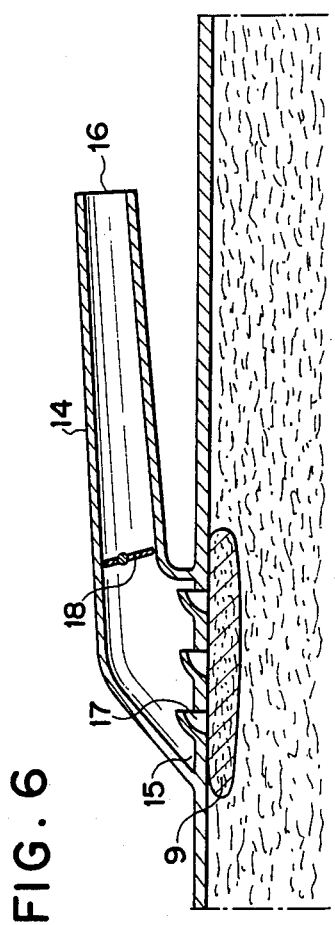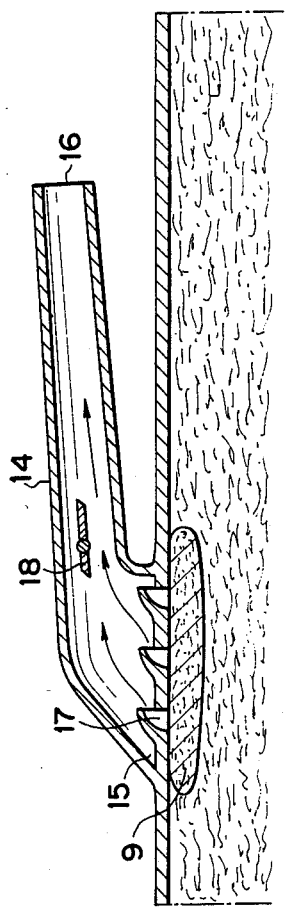

AUTOMOBILE MUFFLER

BACKGROUND OF THE INVENTION

1. Field of the Invention

The present invention relates to an automobile muffler, and more particularly to an automobile muffler which is capable of draining water from the sound-deadening space defined between its exhaust and outer pipes, thus assuring that no water remains in the sound-deadening space.

2. Description of the Prior Art

As is well known, a conventional automobile muffler comprises outer and inner or exhaust pipes defining the sound-deadening space therebetween, the sound-deadening space being filled with sound-deadening material. While the automobile muffler is used, water is accumulated in the sound-deadening space for the following reasons: the exhaust gas at an elevated temperature flows from the engine to the muffler to raise the temperature of the muffler. Accordingly the air within the muffler is heated and expanded. Then, assume that the car stops and its engine stops. Then, no exhaust gas of elevated temperature flows into the muffler, and therefore the temperature of the muffler decreases soon. Accordingly, the temperature of the air within the muffler decreases sharply, and hence the volume of the air within the muffler decreases sharply, therby drawing air from the open end of the muffler from the surrounding atmosphere. Specifically, air is drawn from the open end of the exhaust pipe, passing through the apertures of the exhaust pipe to enter the sound-deadening space within the surrounding outer pipe. The moisture content when heated, rises to the upper area of the sound-deadening space, which still remains at an elevated temperature.

The moisture is accumulated there because no drain is provided. As the sound-deadening space cools down, the moisture reduces to water, and the water descends to the lower area of the sound-deadening space, and is held there. The accumulation of water in the sound-deadening space of the muffler will have an adverse effect on sound-deadening. Also disadvantageously, the accumulated water will be scattered from the open end of the muffler when the engine starts, and the sputtering water fouls the surrounding. In an attempt to solve such problems it has been proposed that a drain cock is provided to the bottom of the outer pipe, thereby permitting the water to be drawn out of the sound-deadening space of the muffler. However, a person must craul on the back under the automobile chassis to open the drain cock, and this is no easy work.

In an attempt to solve this problem an automobile muffler as shown in FIGS. 8 and 9 is proposed. As shown, its outer pipe 1' is equipped with a drain pipe 2', one end 3' of which is put in the lower area y' of the sound-deadening space 4' of the muffler, thereby permitting the accumulated water 5' to flow out of the outer pipe 1' via the drain pipe 2'. This automobile muffler, however, has following defects: (a) it cannot prevent condensation of moisture to water in the upper area of the sound-deadening space 4' of the muffler (it is difficult to remove the water from the sound-deadening space 4' because the water is caught between the narrow inter-spaces of filament like sound-deadening material); and (b) the water descends by gravity all the time, and therefore water is accumulated in the lower area of the sound-deadening space. In the past, effort was directed to remove water from the lower area of the sound-deadening space of the muffler.

SUMMARY OF THE INVENTION

With the above in mind one object of the present invention is to provide an automobile muffler which is capable of: (1) automatically drawing moisture out of the muffler before the moisture of the air drawn in the sound-deadening space is condensed to water at its upper area: (2) thus minimizing accumulation of water in the sound-deadening space; (3) preventing decrease of the sound-deadening efficiency of the muffler; and (4) eliminating the possibility of water sputtering from the open end of the muffler when the engine starts.

To attain this object an automobile muffler comprising an exhaust pipe having a plurality of apertures made on its circumference, an outer pipe enclosing the exhaust pipe and sound-deadening material packed in the sound-deadening space defined between the exhaust pipe and the outer pipe, said outer pipe having a drain pipe for drawing water from said sound-deadening space to the exterior of the automobile muffler, is improved according to the present invention in that said drain pipe is connected to said outer pipe so as to communicate with the upper half area of said sound-deadening space.

In operation, the moisture content of the air is drawn in the sound-deadening space of the muffler subsequent to the stop of the engine, and before condensation of the moisture to water in the sound-deadening space, the moisture is allowed to leave the sound-deadening space for the surrounding atmosphere.

The moisture content of the air which is drawn in the sound-deadening space, is heated in the sound-deadening space at an elevated temperature, and therefore the moisture rises up in the upper area of the sound-deadening space. Then, the rising moisture enters the drain pipe, which opens on the ceiling of the outer tube. Thus, the moisture leaves the muffler via the drain pipe. The continuous removal of moisture from the upper area of the sound-deadening space prevents moisture from being in saturated condition and remaining in the upper area of the sound-deadening space. Thus, the condensation of moisture to water in the upper area of the sound-deadening space is minimized. Accordingly, the reduction of the sound-deadening effect is minimized. Also, there is no water sputtering from the muffler at the start of the engine.

Other objects and advantages of the present invention will be understood from the following description of a preferred embodiment, which is shown in the accompanying drawings:

FIGS. 1 to 7 show an automobile muffler according to the preferred embodiment of the present invention.

FIG. 1 is a plane view of the automobile muffler;

FIG. 2 is a longitudinal section taken along the line II—II in FIG. 1;

FIG. 3 is a perspective view of the automobile muffler;

FIG. 4 is a plane view of an exhaust pipe;

FIG. 5 is a longitudinal section of a part of the exhaust pipe, showing how the exhaust gas flows out of and into the exhaust pipe;

FIG. 6 is a longitudinal section of a drain pipe with its butterfly valve closed;

FIG. 7 is a similar longitudinal section of the drain pipe with its butterfly valve open; and;

Figure 4:
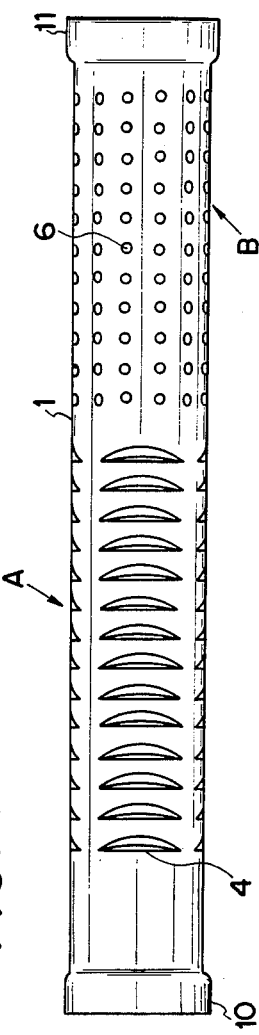

Referring to FIGS. 1 to 7, there is shown an automobile muffler according to one preferred embodiment of the present invention. An exhaust pipe 1 has a plurality of apertures made on its circumference. An outer pipe 2 encircles the perforated exhaust pipe 1. A sound-deadening space 3 is defined between these pipes 1 and 2, and is filled with sound-deadening material 3. As for the exhaust pipe 1 two different kinds of apertures are made at regular intervals in the upstream and downstream portions A and B of the exhaust pipe 1, as best seen in FIG. 4. Each aperture 4 in the upstream portion A of the exhaust pipe 1 has a slit opening and a downward-inclined projection 5 extending from the downstream edge of the slit opening 4 in the form of cantilever, thus directing the free end 5' of the downward-inclined cantilever projection 5 in the counter direction against the flow of the exhaust gas F so that the waste gas may be easily guided to the sound-deadening space 3. Each aperture 6 made in the downstream portion B of the exhaust pipe 1 has an ordinary opening 6.

Layers of stainless steel wire 7 and stack of glass fiber 8 are laid on each other and used as sound-deadening material 3'. The exhaust pipe 1 can be made by punching making apertures 4 and 6 of different shapes in the upstream and downstream portions of the single pipe and by enlarging somewhat the opposite ends 10 and 11 thereof to diverge outwards on the exhaust side G, thereby facilitating the insertion of opposite pipes 12 and 13 of the same diameter as the exhaust pipe 1 and welding these pipes 12 and 13 to the exhaust pipe 1 in fixing the muffler to the automobile.

Figure 5:
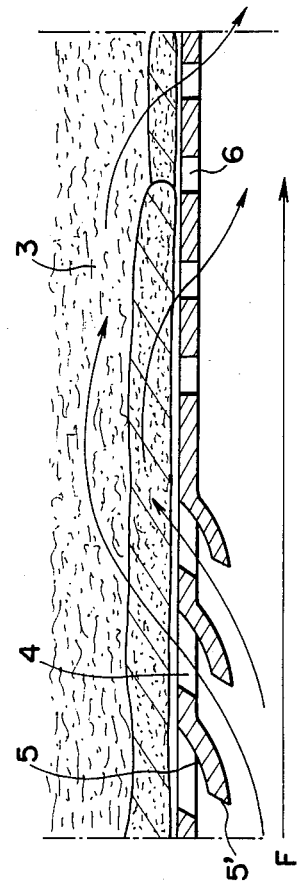
Figure 8:
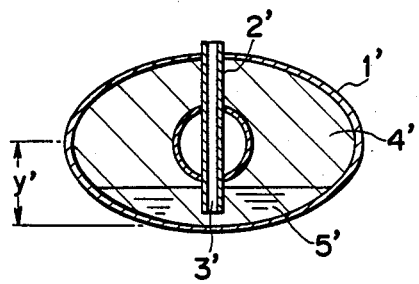
FIGS. 8 and 9 show a conventional automobile muffler.
Figure 9:
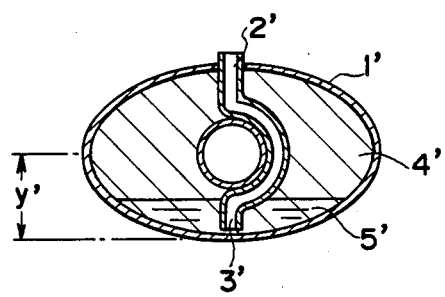

In operation, a minor part of the waste gas which is ejected from the engine, is allowed to pass through the exhaust pipe 1 to the surrounding atmosphere, but the major part of the waste gas passes through the slit apertures 4 of the upperstream portion A of the exhaust pipe 1 to the sound-deadening space 3, where the gas is allowed to expand, and accordingly the pressure and temperature of the gas is lowered. At the same time, the sound is produced, but it is deadened by stainless steel wire stuffing 7 and other sound-deadening material 3'. Then, the gas flows from the sound-deadening space to the inside of the exhaust pipe 1 after passing through the apertures 6 of the downstream portion B of the exhaust pipe 1, and then the gas leaves the exhaust pipe for the surrounding atmosphere, as best seen in FIG. 5.

As is readily understood, the downward-inclined cantilever projection 5 of each aperture 4 in the upstream portion A of the exhaust pipe 1 is directed in the opposite relationshp to the flow of the waste gas F, and this arrangement is appropriate for directing the waste gas from the inside of the exhaust pipe 1 to the surrounding sound-deadening space 3. Then, the waste gas is drawn from the sound-deadening space 3 to the inside of the exhaust pipe 1 via the apertures 6 of the downstream portion B of the exhaust pipe 1 by section, which is caused by the waste gas directly flowing from the engine to the surrounding atmosphere in the exhaust pipe 1. With this arrangement the sound-deadening effect is enhanced by expediting the expansion and hence decrease of temperature and pressure of the waste gas in the muffler.

There is no discontinuity between the upstream and downstream perforated portions of the exhaust pipe because of these perforated portions belonging to a single length of pipe. Therefore, there can be no disturbance in the flow of the waste gas in the exhaust pipe. Also, the pipes 12 and 13 are fitted in the enlarged opposite ends of the exhaust pipe 1, thereby minimizing the discontinuity between these pipes 12, 13 and the exhaust pipe 1 to cause little or no substantial disturbance in the flow of the waste gas.

Figure 1:
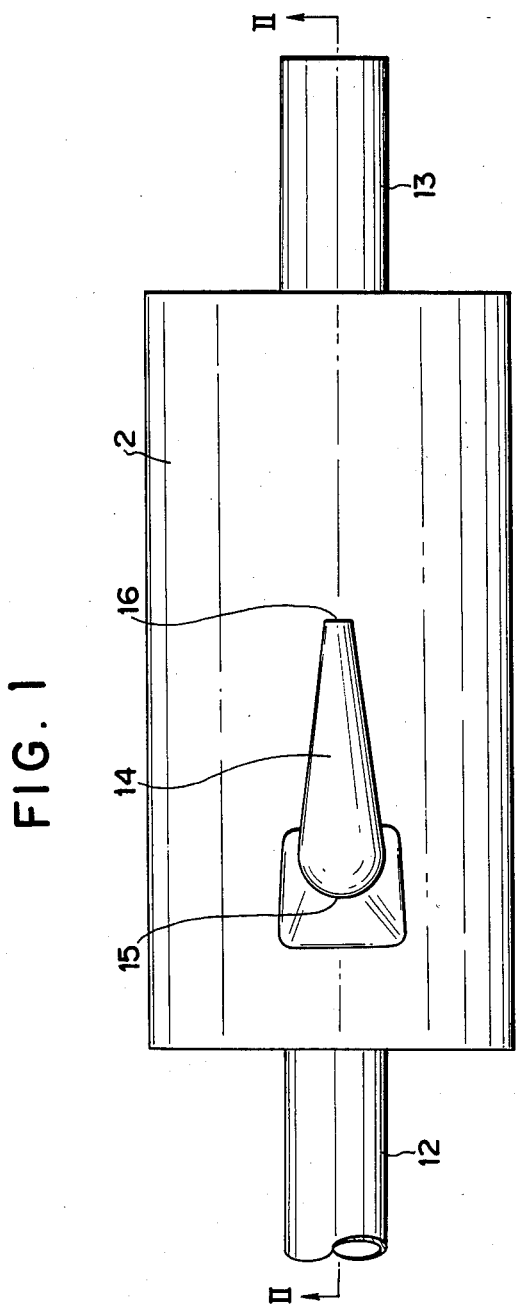
Figure 2:
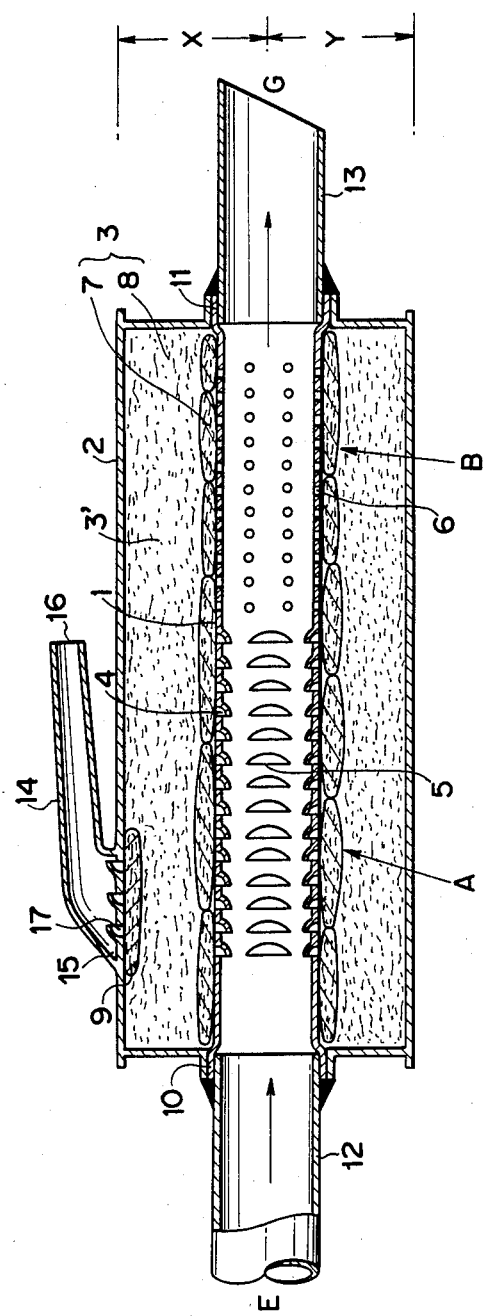
Figure 3:
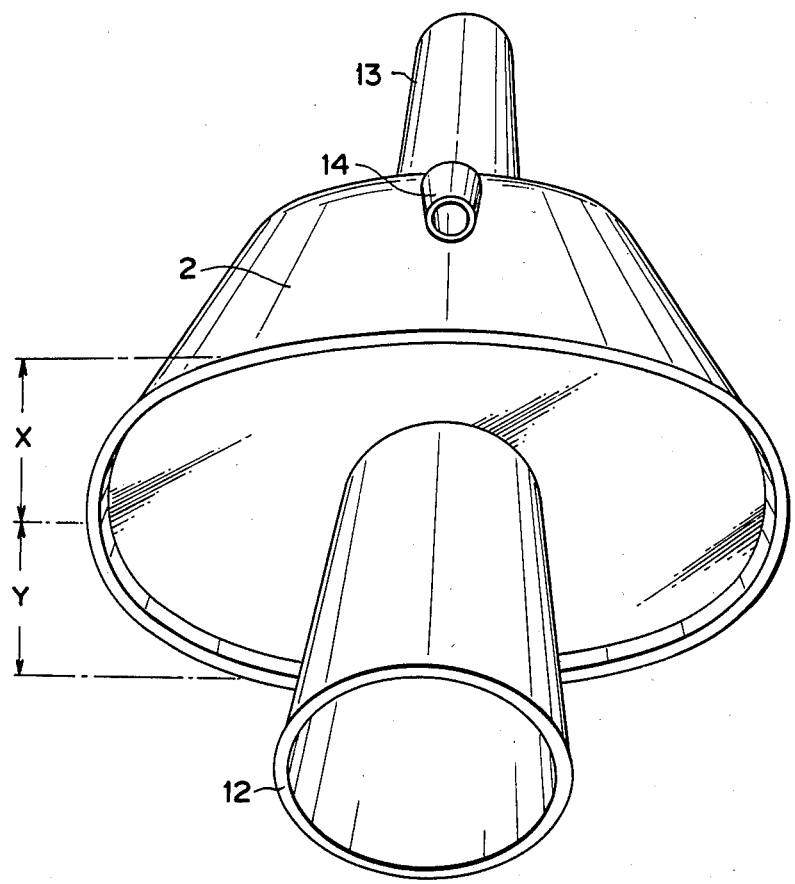

An automobile mubbler according to the present invention has a special structure as described below. As shown in FIGS. 1 to 3 and 6 and 7, the outer pipe 2 is equipped with a drain on discharge pipe 14 in its upper half portion X. The drain pipe 14 communicates with the sound-deadening space 3 so that the steam generated in the sound-deadening material may be allowed to escape from the sound-deadening space 3 to the surrounding atmosphere. Specifically, one end 15 of the drain pipe 14 is fixed to the upper surface of the outer pipe 2 around a discharge opening 17 thereof, and the other open end 16 of the discharge pipe 14 is directed towards the downstream end of the mubbler. The drain pipe 14 has a small diameter, compared with the outer pipe 2 and the exhaust pipe 1. The drain pipe 14 is connected to the outer pipe 2 at a position as close to the upstream end of the outer pipe 2 as possible. As shown in FIG. 2, layer of stainless steel wire is applied to the discharge opening 17. In this particular embodiment the drain pipe 14 is shown as being fixed to the uppermost portion of the outer pipe 2, but it should be noted that the drain pipe 14 may be fixed to the outer tube 2 somewhere else in the upper half portion X of the outer pipe 2.

When the engine is operating, waste gas at an elevated temperature flows into the sound-deadening space 3 so that its temperature may be raised. Accordingly, the waste gas remaining in the sound-deadening space is heated and expanded. After the engine stops, no waste gas flows into the sound-deadening space, and therefore, the temperature of the sound-deadening space descends with time. Accordingly, the remaining waste gas and air begin reducing its volume, and hence the pressure in the sound-deadening space 3 descends. As a result fresh air is drawn from the downstream end of the exhaust pipe 1 to flow in the sound-deadening space 3, where the air is heated. Then, the moisture content of the air is heated to rise into the upper half inside area X of the outer pipe 2. In a conventional automobile muffler the ceiling of the upper half area X inside the outer pipe 2 is completely closed, and therefore, the rising moisture remains in the upper half area X. It reduces to water when the sound-deadening space gets cold. The resulting water descends into the lower half area inside the outer pipe 2, and water is accumulated there.

In the automobile muffler of the present invention the drain pipe 14 communicates with the upper half inside area X of the outer pipe 2 to allow the rising moisture to enter and pass through the drain pipe 14 to the surrounding atmosphere. Therefore, the upper half inside area X of the outer pipe 2 cannot be filled and saturated with moisture, which would be reduced to water when the sound-deadening space gets cold. Contrary to removal of water resulting from condensation of moisture in the conventional muffler, the moisture is removed prior to condensation to water, thereby preventing accumulation of water in the lower half inside area of the outer pipe 2. The moisture when heated, automatically rises and leaves the sound-deadening space to the surrounding atmosphere via the drain pipe. The discharge of the heated moisture is expedited by the chimney effect, which is caused by the length of channel extending in the drain pipe.

FIGS. 6 and 7 show a drain pipe 14 equipped with a butterfly valve 18. The butterfly valve 18 is responsive to the generation of water vapor in the sound-deadening space 3 for opening and permitting the water vapor to leave for the surrounding atmosphere. After the water vapor leaves for the surrounding atmosphere the butterfly valve 18 is allowed to return to its initial closing position by gravity, thereby preventing invasion of water from the open end 16 of the drain pipe 14.

As described above, an automobile muffler according to the present invention has a drain pipe communicating with the upperstream, upper half inside sound-deadening area of its outer pipe, thereby allowing the moisture of the air drawn into the sound-deadening space to leave for the surrounding atmosphere via the drain pipe prior to condensation of the moisture to water in the sound-deadening space, thus making it unnecessary to drain water from the muffler, preventing the lowering of sound-deadening effect, and causing no sputtering of water from the downstream end of the exhaust pipe.

What is claimed is:

1. An automobile muffler comprising an exhaust pipe 1 having a plurality of apertures made on a circumference thereof, an outer pipe 2 enclosing the exhaust pipe 1 and sound-deadening material 3' packed in a sound-deadening space 3 defined between the exhaust pipe and the outer pipe, said outer pipe 2 having a drain pipe 14 for drawing water from said sound-deadening space 3 to an exterior of the automobile muffler, characterized in that said drain pipe 14 is connected to said outer pipe so as to communicate with an upper half area X of said sound-deadening space 3.

2. An automobile muffler according to claim 1 wherein said exhaust pipe is equipped with a butterfly valve 18, which is normally put in a closing position by gravity, and is responsive to steam pressure for opening, thereby allowing the steam to escape to the exterior of the automobile muffler.

3. An automobile muffler according to claim 1 wherein each of the apertures 4 made in an upstream portion A of said exhaust pipe 1 has slit opening and a downward-inclined projection 5 extending from a downstream edge of the slit opening in a form of a cantilever, thus directing a free end 5' of the downward-inclined projection 5 in a counter direction against a flow of exhaust gas F, whereas each of the apertures 4 made in a downstream portion B of said exhaust pipe 1 has an ordinary opening 6, said exhaust pipe being a single pipe with opposite ends 10, 11 somewhat enlarged in diameter, thereby facilitating insertion of opposite pipes 12, 13 of the same diameter as said exhaust pipe 1.

* * * * *